United States Patent
Fairbanks

[11] 3,723,438
[45] Mar. 27, 1973

[54] WEB STRETCHING METHOD
[75] Inventor: Theodore H. Fairbanks, Liverpool, Pa.
[73] Assignee: FMC Corporation, Philadelphia, Pa.
[22] Filed: July 13, 1970
[21] Appl. No.: 54,196

[52] U.S. Cl. .................264/289, 161/76, 161/402, 264/288
[51] Int. Cl. .................................................B29d 7/24
[58] Field of Search.............264/288, 289, 282, 291; 161/50, 51, 52, 76, 77, 402

[56] References Cited
UNITED STATES PATENTS

| 2,332,848 | 10/1943 | Grabec | 161/76 |
| 2,677,872 | 5/1954 | Teague | 161/76 X |
| 3,363,038 | 1/1968 | Billarant | 264/282 X |
| 3,392,078 | 7/1968 | Duhl | 161/50 |
| 3,455,306 | 7/1969 | Spanel | 161/77 X |
| 3,255,065 | 6/1966 | Wyckoff | 264/289 X |
| 2,943,380 | 7/1960 | Suckle | 161/50 X |
| 3,440,133 | 4/1969 | Burnett | 161/77 X |
| 2,533,976 | 12/1950 | Teague | 161/76 |

FOREIGN PATENTS OR APPLICATIONS

| 644,634 | 7/1962 | Canada | 161/77 |
| 427,079 | 5/1911 | France | 161/77 |
| 915,694 | 1/1963 | Great Britain | 264/289 |
| 1,351,074 | 12/1963 | France | 161/76 |

OTHER PUBLICATIONS

Miller, M. L. "The Structure of Polymers," New York, Reinhold, 1966, pages 557–565, (Polymer Science and Engineering Series).

Primary Examiner—Philip E. Anderson
Attorney—Thomas R. O'Malley, George F. Mueller and Eugene G. Horsky

[57] ABSTRACT

Web stretching method wherein an unstretched web is elongated between each of adjacent selected locations of a series of such locations which are aligned in the direction of applied stretching tensions, with reinforcing members attached to the web for limiting web elongation between such locations to a predetermined degree.

8 Claims, 7 Drawing Figures

PATENTED MAR 27 1973 3,723,438
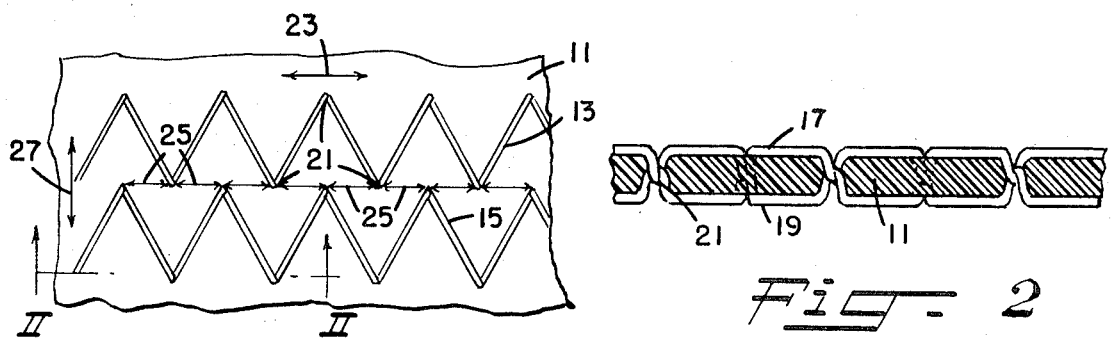
Fig. 1
Fig. 2
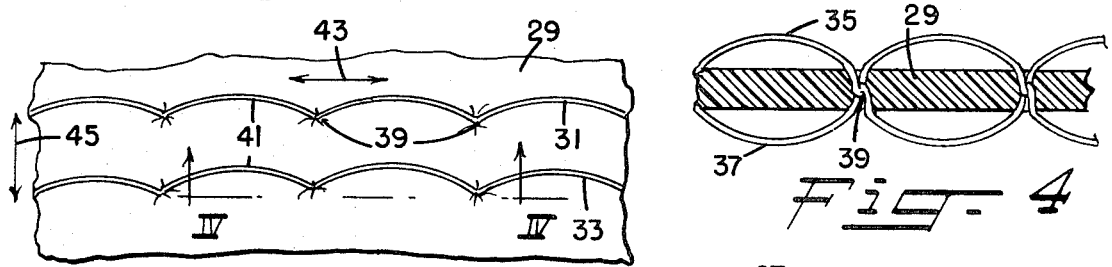
Fig. 3
Fig. 4
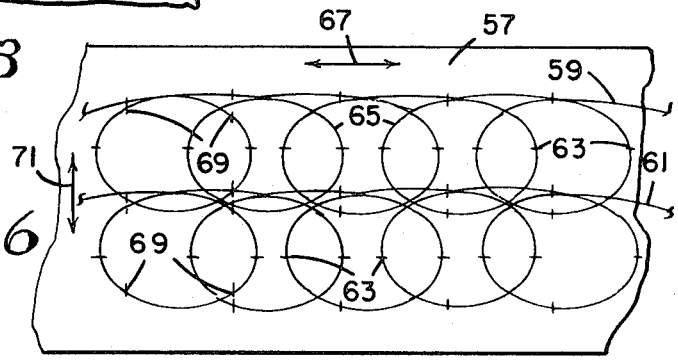
Fig. 6
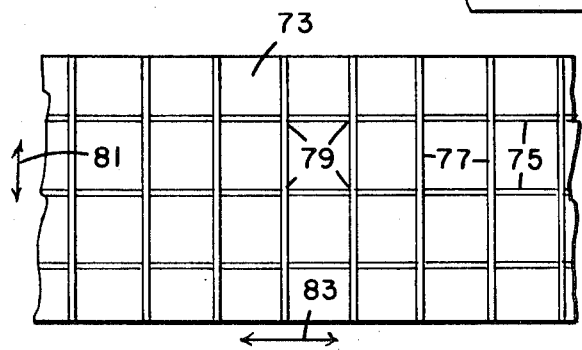
Fig. 7
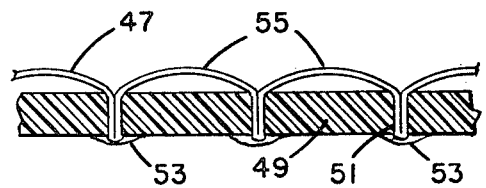
Fig. 5

WEB STRETCHING METHOD

The present invention relates to a method for effecting a controlled stretching of webs.

Stretching of webs is generally achieved by clamping or restraining the same at spaced areas and then urging such spaced areas away from each other. For example, transverse stretching of continuous, flat films may be achieved using a conventional tenter frame, while the longitudinal elongation thereof may be provided by passing the film between spaced pairs of rollers which are turned at different speeds.

Using known stretching procedures, the application of sufficient tension to a web to secure desired stretching thereof tends also to cause web splitting or tearing. One proposal for at least minimizing this tendency is to clamp the web which is to be stretched between a pair of elastic sheets, and then subject both such web and the pair of elastic sheets to the necessary tensions to secure the desired degree of web stretching. This procedure, however, is difficult to practice, is inefficient since considerable energy is required to stretch both the web and the pair of elastic sheets between which it is clamped, and necessitates a complicated and expensive apparatus. Accordingly, a primary object of this invention is to provide a generally new or improved and more satisfactory method for stretching webs.

Another object is the provision of an improved method for effecting a desired stretching of a web along one or both axial directions thereof, with web splitting or tearing being at least minimized.

Still another object is to provide an improved method for achieving a controlled and predetermined stretching of webs.

A further object is the provision of an improved method wherein a web is subjected to a limited stretch along each of a series of selected areas, which areas together provide the desired total elongation of such web.

A still further object is to provide a method in which a web is stretched between each of adjacent selected locations of a series of such locations which are aligned in the direction of applied stretching tensions, with reinforcing members attached to the web for limiting web elongation between such locations to a predetermined degree.

A still further object is to provide an improved web stretching method which is simple in practice, economical, and can be achieved using conventional web stretching apparatus.

These and other objects of the invention are achieved by a method in which each of a plurality of reinforcing members are fixed at spaced intervals thereof onto at least one side of an unstretched web in a manner as to at least minimize relative movement between such web and the reinforcing members at such locations of fixation. The lengths of the respective reinforcing members which extend between adjacent locations of fixation thereof are intended to limit stretching of the web to a desired degree between fixation locations of the reinforcing members which are adjacent to and aligned with each other in a desired direction of web stretching. Thereafter, the web and reinforcing members are together tensioned to such an extent as to make taut the lengths of the respective reinforcing members which extend between adjacent locations of fixation thereof.

The reinforcing members employed in the method of the present invention may consist of continuous threads, cords, strands, ribbons or other like structures. For satisfactory practice of the method of the present invention, it is essential that the locations at which the respective reinforcing members are fixed to the web be spaced from but aligned with fixation locations of reinforcing members which are adjacent thereto in a desired direction of web stretching. The spacing between the aligned locations at which adjacent reinforcing members are fixed to the web may be varied, with generally the smaller the spacing between such locations, the greater is the ability of the web to resist tensions which might otherwise induce splitting or tearing thereof.

In one embodiment of the invention, each of the reinforcing members is comprised of threads or other like structures disposed along opposite sides of an unstretched web and extending along like, sinuous paths which are aligned with each other. The threads comprising the respective reinforcing members are connected to each other at spaced intervals thereof to fix the same to such web. This arrangement of reinforcing members can be provided merely by sewing threads onto the unstretched web in a zig-zag or saw-tooth pattern using a conventional sewing machine, with threads along the opposite sides of the web being connected at spaced intervals thereof as by a lock stitches.

The sinuous paths of adjacent of such reinforcing members are of like frequency and may be in phase with each other or in a staggered array. Aside from the necessary alignment of fixation locations, as noted above, the locations along the respective sinuous paths at which the reinforcing members are fixed to the web is not critical and, from the standpoint of convenience, such fixations may be provided at the crests and valleys of such paths.

In another embodiment, threads or other like structures may be disposed along one or both sides of an unstretched web, lineally in a desired direction of web stretching. Each of such threads are fixed to the unstretched web at spaced locations thereof with the lengths thereof extending between adjacent locations of fixation being in a slack condition. Threads applied, as by sewing, to opposite sides of the web may be connected to each other at spaced intervals, as by a lock stitches, while threads disposed onto only one side of such web may be fixed, for example, by projecting bight portions thereof through the unstretched web and securing the same along the opposite side thereof, as with an adhesive.

In a further embodiment of the invention, each of the reinforcing members may consist of a thread or other like structure disposed onto one side of an unstretched web as a series of loops, with the loops of each such thread together extending in a desired direction of web stretching. Each loop of the respective reinforcing members overlaps with only portions of adjacent loops of the same and/or adjacent reinforcing members and is fixed to the unstretched web at spaced intervals thereof. For example, reinforcing members formed from thermoplastic materials may be extruded onto an unstretched web, either concomitantly with or subsequent to its formation, with only minimal bonding therebetween. Such reinforcing members may then be fixed to the web at spaced intervals thereof, as by a heated roll having a discontinuous peripheral surface.

In a still further embodiment of the present invention the reinforcing members consist of elastic threads or other like structures. Such members are disposed onto one side of an unstretched web, lineally in a desired direction of web stretching. Fixing of the respective elastic members at spaced intervals thereof, as with an adhesive, is effected while such members are in relaxed conditions.

The method of the present invention is adapted for use with a variety of webs, as for example, woven and nonwoven fabrics, paper sheets and foamed films. The invention is particularly useful in orienting the molecules of unbroken films formed of polymeric materials, and is hereafter described in detail in such application. The orientable polymeric materials from which such films are formed are not critical and may include, for example, polyolefins, polyesters, polyamides, etc. Stretching of thermoplastic polymeric films is preferably effected while such films are heated to within an orientation temperature range which is above their particular second order phase transition temperatures and below temperatures at which relaxation of the orientation effect achieved by stretching occurs so rapidly that the film retains no significant orientation once stretching ceases.

Except for the last-described embodiment, the reinforcing members employed in the method of the present invention may be formed of any desired material, and preferably should exhibit no significant elongation in response to the stretching tensions which are to be exerted to provide for the desired web stretching. Once web stretching is completed, the reinforcing members may be removed therefrom, if desired.

Stretching of webs or films in accordance with the method of the present invention may be effected along one or both axial directions thereof, with the latter being achieved either sequentially or simultaneously. Conventional tenter frames and/or differential speed rolls or other known stretching apparatus may be used in carrying out the method of the present invention.

For a greater understanding of this invention, reference is made to the following detailed description and drawing in which FIG. 1 is a plan view diametrically illustrating a portion of a web which has been prepared in accordance with one embodiment of the present invention;

FIG. 2 is a vertical section taken along the lines II—II of FIG. 1;

FIG. 3 is a view similar to FIG. 1 illustrating a portion of a web which has been prepared in accordance with another embodiment of the present invention;

FIG. 4 is a vertical section taken along the line IV—IV of FIG. 3;

FIG. 5 is a view similar to FIG. 4 illustrating a further embodiment of the invention; and FIGS. 6 and 7 are views similar to FIGS. 1 and 2 each illustrating a portion of a web which has been prepared in accordance with still further embodiments of the present invention.

With reference to the drawing, FIGS. 1 and 2 illustrate a portion of an unbroken, unstretched film or web 11, formed for example of polypropylene. A plurality of spaced reinforcing members, two of which are shown at 13 and 15, are attached to the film 11 at spaced intervals thereof. The reinforcing members are each comprised of a pair of threads 17 and 19 which, by the use of a conventional sewing machine, are disposed along opposite sides of the film 11 and are connected at spaced intervals to each other and to the film 11 by lock stitches 21.

As shown in FIG. 1, the respective reinforcing members extend along sinuous or zig-zag paths, with the lock stitches 21 between the threads 17 and 19 of the respective reinforcing members being located at the crests and valleys thereof. More particularly, the sinuous paths of the reinforcing members are of like frequency and in phase with each other whereby the respective crests and valleys of adjacent of such members are substantially in vertically aligned relationship, as viewed in FIG. 1. Further, the spacing between adjacent of such reinforcing members is such that the crests of one of such members are substantially aligned with the valleys of an adjacent of such members in a horizontal direction, as viewed in FIG. 1.

The unstretched film 11, provided with reinforcing members as described above, is heated to within an orientation temperature range and then tensioned, as by a tenter frame, in the direction indicated by the double-headed arrows 23. Stretching of the heated film 11 occurs independently along each of the areas indicated at 25, which extend between adjacent, horizontally aligned lock stitches 21. During such stretching of the film 11, the sinuous paths of the respective reinforcing members become progressively less pronounced, with each such member tending to assume a position extending lineally across the film in the direction of the applied stretching tensions.

Stretching and molecular orientation of the film 11 is continued until the lengths of the respective reinforcing members extending between adjacent lock stitches thereof are taut. The reinforcing members themselves are such as to exhibit no significant elongation and thus, at this stage, no further additional tension is applied to the film. The stretched, molecularly oriented film is held in its tensioned condition, however, until it is cooled to below its orientation temperature range. If desired, the reinforcing members may now be removed from the film.

It will be noted that reinforcing members, such as 13 and 15, extend in the direction in which the film 11 is intended to be stretched. Thus, in lieu of or in addition to the reinforcing members described, reinforcing members may be disposed vertically of the film 11, as viewed in FIG. 1, to facilitate stretching and orientation thereof in the direction indicated by the double-headed arrow 27.

All reinforcing members are preferably disposed along sinuous paths of like frequency. The frequency of such paths may, however, be varied to change the lengths of the areas 25 between adjacent, aligned crests and valleys of adjacent reinforcing members. The greater the frequency of such sinuous paths, the shorter each such areas 25 become. There are, however, more of the aligned areas 25 provided across the film 11 and thus less tension must be exerted onto each such area to stretch the same to a desired degree.

As heretofore mentioned, adjacent reinforcing members may be arranged in staggered relationship. However, crests and valleys of such adjacent members must be in aligned relationship and must not overlie each other to provide for proper stretching of the film.

In the embodiment of the invention shown in FIGS. 3 and 4, an unbroken, unoriented thermoplastic polymeric film 29 is provided with a plurality of spaced reinforcing members, two of which are illustrated at 31 and 33. Each of these reinforcing members consists of threads 35 and 37 which are sewn onto the film 29 by a conventional sewing machine, with the threads 35 and 37 being disposed along opposite sides of the film 29 and connected to each other and to such film by lock stitches 39. In this particular embodiment, the reinforcing members are disposed lineally across the film 29 in the desired direction of film stretching with the lengths 41 of such members extending between adjacent lock stitches 39 being in a slack condition.

The film 29 shown in FIGS. 3 and 4 is heated to within its orientation temperature range and then tensioned in the direction indicated by the double-headed arrow 43 whereby the areas of such film 29 which extend between adjacent lock stitches 39 of the respective reinforcing members are stretched and oriented. These tensions are continued until the lengths 41 of the respective reinforcing members are taut, after which the stretched and molecularly oriented film is cooled to below its orientation temperature range while being held under tension.

The threads 35 and 37 comprising the respective reinforcing members exhibit no significant elongation under the tension applied to the film 29 and thus they serve to limit stretching of such film to a desired degree. The extent to which the film 29 is permitted to yield may be varied by changing the amount of slack provided in the lengths 41 of the respective reinforcing members.

In lieu of or in addition to reinforcing members described, the film 29 may be provided with like reinforcing members disposed vertically thereof, as viewed in FIG. 3, to permit stretching thereof, in accordance with the method of the present invention, in the direction indicated by its double-headed arrow 45.

FIG. 5 illustrates a further embodiment which differs from that shown in FIGS. 3 and 4 only in that each reinforcing member consists of a single thread 47 sewn onto an unbroken, unstretched film 49 lineally in the direction of intended film stretching. More particularly, the threads 47 are disposed along one side of the film 49 with bight portions 51 of each of such threads being projected through the film 49 and fixed to the opposite side thereof as by adhesive, which is indicated at 53. The lengths 55 of the respective threads 47 which extend between adjacent bight portions 51 are in a slack condition to permit desired stretching and orientation of the film 49 when tension is applied thereto, as heretofore described with reference to FIGS. 3 and 4.

In the modification shown in FIG. 6, an unbroken, unstretched thermoplastic film 57 is provided with a plurality of reinforcing members, two of which are indicated at 59 and 61. Each of such reinforcing members is continuous and is laid upon the film 57 as a series of loops, with the loops of the respective reinforcing members partially overlapping each other and, if desired, overlapping also loops of adjacent of the reinforcing members. The reinforcing members are then fixed, as by heat sealing or adhesives, to the film 57 at like locations as indicated at 63.

The lengths 65 of the respective reinforcing members are, in effect, slack portions. Thus, when the film 57 is tensioned in a manner as described with reference to FIGS. 1–5, the lengths 65 of the respective reinforcing members will eventually be made taut and thereby limit the degree to which the film 57 may be stretched in the direction indicated by the double-headed arrow 67.

The locations at which the reinforcing members are fixed to the film 57 may be varied, providing locations of fixation are aligned in the direction in which the film is intended to be stretched. Thus, such reinforcing members are fixed to the film 57 at locations as indicated at 69 to facilitate stretching of such film in the direction of the double-headed arrow 71, in addition to or in lieu of the direction shown at 67.

Shown in FIG. 7 is an unbroken unstretched film 73 formed of thermoplastic polymeric material onto one side of which are disposed a plurality of reinforcing elements. As viewed in this figure, spaced reinforcing members 75 extend horizontally of the film 73 while spaced reinforcing members 77 extend vertically thereof. All of the reinforcing members are formed of elastic material, as for example, rubber, and are fixed to the film 73, in a relaxed condition, at locations 79 at which they cross each other.

Stretching of the film 73 is effected in a manner as described with reference to FIGS. 1–6 and is continued to the degree as permitted by the elasticity of the lengths of the respective members extending between adjacent locations of fixation thereof. The arrangement shown in FIG. 7 facilitates biaxial stretching of the film 73. Reinforcing members 75 may be eliminated if stretching of the film 73 is desired in only the direction of the double-headed arrow 81. Similarly, reinforcing members 77 are not employed when stretching of the film 73 is desired only in the direction shown by the double-headed arrow 83.

It is to be understood that changes and variations may be made without departing from the spirit and scope of the present invention as defined in the appended claims.

I claim:

1. A method for effecting controlled stretching of a web including the steps of fixing each of a plurality of individual flexible reinforcing members only at spaced intervals thereof onto at least one side of a preformed, unstretched web of orientable thermoplastic polymeric material in a manner as to at least minimize relative movement between such web and the reinforcing members at such locations of fixation, at least some of the locations of fixations along the respective reinforcing members being aligned with each other in a direction in which the web is to be stretched and being spaced but aligned in a direction at right angles to the direction of intended web stretching with locations of fixation of reinforcing members which are adjacent thereto, the respective reinforcing members extending between adjacent, aligned locations of fixation thereof being in a slack or relaxed condition and having lengths which are greater than the distance between such adjacent aligned fixation locations, heating the web to within an orientation temperature range thereof, thereafter stretching the heated web only to such extent as to make taut the lengths of the respective reinforcing members which extend between aligned locations of fixation thereof, and retaining the web in its stretched condition while cooling the same to a temperature below the orientation temperature range thereof.

2. A method as defined in claim 1 wherein the reinforcing members are each comprised of threads disposed along opposite sides of the unstretched web and extending along like, sinuous paths which are aligned with each other, the threads comprising the respective reinforcing members being connected to each other at spaced intervals thereof to fix the same to such web.

3. A method as defined in claim 2 wherein the sinuous paths of the threads of all reinforcing members are of like frequency and are in phase with each other.

4. A method as defined in claim 1 wherein the reinforcing members each include a thread disposed along one side of the web lineally in the direction of desired web stretching, each of such threads being fixed to the unstretched web at spaced locations thereof with the lengths of each such threads extending between adjacent locations of fixation being in a slack condition.

5. A method as defined in claim 4 wherein the threads are each fixed at spaced intervals to the unstretched web by projecting bight portions thereof through the unstretched web and securing the same along the opposite side of such web.

6. A method as defined in claim 1 wherein the reinforcing members each include a continuous strand disposed onto one side of the unstretched web as a series of loops with the loops of each such strand together extending in a desired direction of web stretching, each loop of the respective reinforcing members overlapping with only portions of adjacent loops and being fixed to the unstretched web at spaced intervals thereof.

7. A method as defined in claim 6 wherein the loops of strands forming adjacent reinforcing members overlap partially with each other.

8. A method as defined in claim 1 wherein the web is stretched along biaxial directions.

* * * * *